US011025360B2

(12) United States Patent
Nagai (10) Patent No.: US 11,025,360 B2
(45) Date of Patent: Jun. 1, 2021

(54) OPTICAL ADD AND DROP MULTIPLEXER, OPTICAL COMMUNICATION SYSTEM, AND METHOD FOR CONTROLLING OPTICAL ADD AND DROP MULTIPLEXER

(71) Applicant: NEC Platforms, Ltd., Kawasaki (JP)

(72) Inventor: Shinya Nagai, Tokyo (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 16/976,024

(22) PCT Filed: Jan. 18, 2019

(86) PCT No.: PCT/JP2019/001542
§ 371 (c)(1),
(2) Date: Aug. 26, 2020

(87) PCT Pub. No.: WO2019/167465
PCT Pub. Date: Sep. 6, 2019

(65) Prior Publication Data
US 2020/0412475 A1    Dec. 31, 2020

(30) Foreign Application Priority Data

Feb. 27, 2018    (JP) .............................. JP2018-033212

(51) Int. Cl.
*H04B 10/00*    (2013.01)
*H04J 14/02*    (2006.01)
*H04Q 11/00*    (2006.01)
*H04J 14/00*    (2006.01)

(52) U.S. Cl.
CPC ...... *H04J 14/0202* (2013.01); *H04Q 11/0005* (2013.01); *H04Q 2011/0016* (2013.01); *H04Q 2011/0035* (2013.01)

(58) Field of Classification Search
CPC ... H04Q 2011/0007; H04Q 2011/0009; H04Q 2011/0011; H04Q 2011/0013;
(Continued)

(56) References Cited

U.S. PATENT DOCUMENTS

2011/0135310 A1    6/2011    Kovsh et al.
2012/0243879 A1    9/2012    Nashimoto et al.
(Continued)

FOREIGN PATENT DOCUMENTS

JP    2012-109653 A    6/2012
JP    5840141 B2    1/2016
(Continued)

OTHER PUBLICATIONS

International Search Report dated Apr. 9, 2019, in the corresponding PCT International Application.

(Continued)

*Primary Examiner* — Daniel G Dobson (57) ABSTRACT

A branching unit branches a first wavelength-multiplexed optical signal input through a first transmission line, the first wavelength-multiplexed optical signal including first and second optical signals. A wavelength selection unit receives the branched first wavelength-multiplexed optical signal branched by the branching unit, receives a second wavelength-multiplexed optical signal including a third optical signal in the same band as that of the first optical signal and a fourth optical signal in the same band as that of the second optical signal through a second transmission line, outputs a third wavelength-multiplexed optical signal including the first and fourth optical signals optical to a third transmission line and output the third optical signal. A multiplexing unit outputs a fourth wavelength-multiplexed optical signal in which the branched first wavelength-multiplexed optical signal branched by the branching unit and the third optical (Continued)

signal output from the wavelength selection unit are multiplexed to a fourth transmission line.

8 Claims, 6 Drawing Sheets

(58) Field of Classification Search
CPC ... H04Q 2011/0015; H04Q 2011/0016; H04Q 2011/0018; H04Q 2011/002; H04Q 2011/0022; H04Q 2011/0024; H04Q 2011/0026; H04Q 2011/0028; H04Q 2011/003; H04Q 2011/0032; H04Q 2011/0033; H04Q 2011/0035; H04Q 11/0001; H04Q 11/0003; H04Q 11/0005; H04J 14/02; H04J 14/0201; H04J 14/0202; H04J 14/0204; H04J 14/0205; H04J 14/0206; H04J 14/0208; H04J 14/0209; H04J 14/021; H04J 14/0212; H04J 14/0213; H04J 14/0215; H04J 14/0216; H04J 14/0217; H04J 14/0219; H04J 14/022
See application file for complete search history.

(56) References Cited

U.S. PATENT DOCUMENTS

| | | | |
|---|---|---|---|
| 2016/0028502 A1* | 1/2016 | Mateo Rodriguez | ........................ H04J 14/0212 398/49 |
| 2016/0308638 A1 | 10/2016 | Zhang | |
| 2017/0299814 A1 | 10/2017 | Mikami | |
| 2018/0069648 A1* | 3/2018 | Inada | ...................... H04J 14/00 |
| 2020/0259584 A1* | 8/2020 | Ugajin | ................ H04B 10/038 |

FOREIGN PATENT DOCUMENTS

| | | |
|---|---|---|
| JP | 2016-66935 A | 4/2016 |
| JP | 2016-208407 A | 12/2016 |
| JP | 2017-509183 A | 3/2017 |
| WO | 2017/022231 A1 | 2/2017 |

OTHER PUBLICATIONS

Extended European Search Report for EP Application No. EP19759964.0 dated Apr. 12, 2021.

* cited by examiner

OPTICAL ADD AND DROP MULTIPLEXER, OPTICAL COMMUNICATION SYSTEM, AND METHOD FOR CONTROLLING OPTICAL ADD AND DROP MULTIPLEXER

CROSS-REFERENCE TO RELATED PATENT APPLICATIONS

This application is a National Stage Entry of International Application No. PCT/JP2019/001542, filed Jan. 18, 2019, which claims priority from Japanese Patent Application No. 2018-033212, filed Feb. 27, 2018. The entire contents of the above-referenced applications are expressly incorporated herein by reference.

TECHNICAL FIELD

The present invention relates to an optical add and drop multiplexer, an optical communication system, and a method for controlling an optical add and drop multiplexer.

BACKGROUND ART

In a long-distance optical communication system such as an optical submarine cable system, in order to realize large-capacity communication, a wavelength division multiplexing (WDM: Wavelength Division Multiplexing) technique in which optical signals having different wavelengths are multiplexed with each other and transmitted in the multiplexed state is used.

In the WDM communication system, wavelength-multiplexed optical signals are transmitted through optical amplification repeaters and/or optical add and drop multiplexers (OADM: Optical Add and Drop Multiplexers) provided between an optical line terminal on the transmission side and an optical line terminal on the reception side. A plurality of optical amplification repeaters are arranged at regular intervals between the optical line terminal on the transmission side and the optical line terminal on the reception side in order to compensate for the attenuation of transmitted wavelength-multiplexed optical signals. An optical add and drop multiplexer is disposed in a node in which optical signals are added and dropped. In the node, optical signals are added and dropped according to the wavelength.

As the optical amplification repeater, an optical direct amplification device (hereinafter referred to as an optical amplifier) capable of amplifying power of an optical signal is usually used. In the WDM communication system, it is important to ensure a signal-to-noise ratio (hereinafter referred to as an SN ratio) for the signal wavelength. Therefore, the optical amplifier is controlled so that the sum total of powers of optical signals in a plurality of bands included in the wavelength-multiplexed optical signal is kept constant. However, the power of the optical signal in each band is not controlled. Therefore, in the WDM communication system, dummy light having a wavelength different from that of the optical signal is included in the wavelength-multiplexed optical signal, so that the sum total of the powers in the wavelength-multiplexed optical signal is kept constant while the power balance among the optical signals in the plurality of bands is maintained.

In the WDM communication system for submarine communication, a plurality of countries and companies form a consortium and they form a network in which they share the bands of wavelength-multiplexed optical signals among them. Therefore, optical add and drop multiplexers are provided in order to distribute optical signals. The optical add and drop multiplexer branches a wavelength-multiplexed optical signal into a trunk transmission line and a branch transmission line. The wavelength-multiplexed optical signal that has been dropped to the branch transmission line includes an optical signal having a wavelength for a base place that does not exist on the branch transmission line. Therefore, there is a risk that an optical signal for a base place that does not exist on the branch transmission line may be received by a third party on the branch transmission line. If such an optical signal is received by a third party, it may cause a security problem such as eavesdropping and a leakage of information.

In order to solve such a security problem, an optical add and drop multiplexer with a security measure has been proposed (Patent Literatures 1 and 2). This optical add and drop multiplexer branches an input wavelength-multiplexed optical signal to a trunk transmission line and a branch transmission line, and demultiplexes the wavelength-multiplexed optical signal dropped to the branch transmission line into an optical signal having a wavelength for the trunk transmission line and an optical signal having a wavelength for the branch transmission line. Then, the optical add and drop multiplexer applies a polarization rotation to the optical signal having the wavelength for the trunk transmission line, and multiplexes the polarization-rotated optical signal having the wavelength for the trunk transmission line and the optical signal for the branch transmission line. The wavelength-multiplexed optical signal obtained by the multiplexing is output to the branch transmission line. In this configuration, since the optical signal having the wavelength for the trunk transmission line is degraded to an un-receivable level by the polarization rotation, a third party on the branch transmission line cannot receive the optical signal having the wavelength for the trunk transmission line.

Further, an optical add and drop multiplexer that filters out, from a wavelength-multiplexed optical signal, an optical signal having a wavelength that is not for the branch transmission line has been proposed (Patent Literature 3). In this optical add and drop multiplexer, an input wavelength-multiplexed optical signal is demultiplexed into an optical signal having a wavelength for a trunk transmission line and an optical signal having a wavelength for a branch transmission line by using a first three-port filter. Further, the wavelength-multiplexed optical signal received through the branch transmission line is demultiplexed into an optical signal having the wavelength for the trunk transmission line and an optical signal having a wavelength other than that for the trunk transmission line by using a second three-port filter. The optical signal having the wavelength for the branch transmission line demultiplexed by the first three-port filter and the optical signal having the wavelength other than that for the trunk transmission line demultiplexed by the second three-port filter are multiplexed by using a coupler, and a wavelength-multiplexed optical signal obtained by the multiplexing is output to the branch transmission line. In this configuration, since the optical signal having the wavelength for the trunk transmission line is demultiplexed in advance and hence is not output to the branch transmission line, a third party on the branch transmission line cannot receive the optical signal having the wavelength for the trunk transmission line.

CITATION LIST

Patent Literature

Patent Literature 1: Japanese Unexamined Patent Application Publication No. 2016-066935

Patent Literature 2: Japanese Unexamined Patent Application Publication No. 2016-208407

Patent Literature 3: Japanese Patent No. 5840141

SUMMARY OF INVENTION

Technical Problem

In the WDM communication system, from the viewpoint of its operation, it is necessary to reduce the burden for repairs and adjustments of optical add and drop multiplexers after they are laid down. For example, it is very difficult to repair a submarine optical add and drop multiplexer after it is laid down on the seabed. Therefore, such an optical add and drop multiplexer needs to be highly reliable. Further, a plurality of optical add and drop multiplexers are connected by a cable, and they are supplied with electricity through the cable. Therefore, it is also necessary to reduce the power consumption of each optical add and drop multiplexer. Therefore, in order to reduce the failure rate and the power consumption of such an optical add and drop multiplexer, it is desired to reduce the number of components disposed therein.

However, in the optical add and drop multiplexers disclosed in Patent Literatures 1 and 2, it is necessary to use a component(s) for the wavelength demultiplexing, that for the polarization rotation, and that for the multiplexing in order to ensure the security of optical signals. Further, each of the component for the wavelength demultiplexing, that for the polarization rotation, and that for the multiplexing may be composed of a plurality of components. Therefore, at least three components must be added in order to realize the optical add and drop multiplexer disclosed in Patent Literature 1 or 2.

In the optical add and drop multiplexer disclosed in Patent Literature 3, it is necessary to use two three-port filters and one coupler in order to ensure the security of optical signals. In an ordinary optical add and drop multiplexer, a wavelength-multiplexed optical signal received through a trunk transmission line is demultiplexed into an optical signal having a wavelength for the trunk transmission line and an optical signal having a wavelength for a branch transmission line by using a coupler. That is, as compared to an ordinary optical add and drop multiplexer, at least two three-port filters are added in order to realize the optical add and drop multiplexer disclosed in Patent Literature 3.

That is, in the optical add and drop multiplexers disclosed in Patent Literatures 1 to 3, it is necessary to add a plurality of components in order to ensure the security of optical signals and it is difficult to reduce the number of components disposed therein. Further, when the number of optical components connected by an optical fiber increases, the loss of the optical signal also increases. If the optical signal is amplified to compensate for the loss, the power consumption increases.

The present invention has been made in view of the above-described circumstances, and an object thereof is to provide an optical add and drop multiplexer, an optical communication system, and a method for controlling an optical add and drop multiplexer, capable of ensuring the security in wavelength-multiplexing optical communication with a simple configuration.

Solution to Problem

An optical add and drop multiplexer according to an aspect of the present invention includes: a branching unit configured to branch a first wavelength-multiplexed optical signal input through a first transmission line, the first wavelength-multiplexed optical signal including a first optical signal and a second optical signal in a band different from that of the first optical signal; a wavelength selection unit configured to receive one of the branched first wavelength-multiplexed optical signals branched by the branching unit, receive a second wavelength-multiplexed optical signal including a third optical signal in the same band as that of the first optical signal and a fourth optical signal in the same band as that of the second optical signal through a second transmission line, output a third wavelength-multiplexed optical signal including the first optical signal and the fourth optical signal to a third transmission line, and output the third optical signal; and a multiplexing unit configured to output a fourth wavelength-multiplexed optical signal including the other of the branched first wavelength-multiplexed optical signals branched by the branching unit and the third optical signal output from the wavelength selection unit to a fourth transmission line.

An optical communication system according to an aspect of the present invention includes: an optical add and drop multiplexer; a first optical line terminal configured to output a first wavelength-multiplexed optical signal including a first optical signal and a second optical signal in a band different from that of the first optical signal to the optical add and drop multiplexer through a first transmission line; a second optical line terminal configured to receive a third wavelength-multiplexed optical signal from the optical add and drop multiplexer through a third transmission line; and a third optical line terminal configured to output a second wavelength-multiplexed optical signal including a third optical signal in the same band as that of the first optical signal and a fourth optical signal in the same band as that of the second optical signal to the optical add and drop multiplexer through a second transmission line, and receive a fourth wavelength-multiplexed optical signal from the optical add and drop multiplexer through a fourth transmission line, in which the optical add and drop multiplexer includes: a branching unit configured to branch the first wavelength-multiplexed optical signal; a wavelength selection unit configured to receive one of the branched first wavelength-multiplexed optical signals branched by the branching unit and the second wavelength-multiplexed optical signal, output a third wavelength-multiplexed optical signal including the first optical signal and the fourth optical signal to the third transmission line, and output the third optical signal; and a multiplexing unit configured to output the fourth wavelength-multiplexed optical signal including the other of the branched first wavelength-multiplexed optical signals branched by the branching unit and the third optical signal output from the wavelength selection unit to the fourth transmission line.

A method for controlling an optical add and drop multiplexer according to an aspect of the present invention includes: in the optical add and drop multiplexer including: a branching unit configured to branch a first wavelength-multiplexed optical signal input through a first transmission line, the first wavelength-multiplexed optical signal including a first optical signal and a second optical signal in a band different from that of the first optical signal; a wavelength selection unit configured to receive one of the branched first wavelength-multiplexed optical signals branched by the branching unit, and receive a second wavelength-multiplexed optical signal including a third optical signal in the same band as that of the first optical signal and a fourth optical signal in the same band as that of the second optical signal through a second transmission line; and a multiplexing unit configured to output a fourth wavelength-multiplexed optical signal including the other of the branched first wavelength-multiplexed optical signals branched by the branching unit and the third optical signal output from the wavelength selection unit to a fourth transmission line, controlling the wavelength selection unit so as to output a third wavelength-multiplexed optical signal including the first optical signal and the fourth optical signal to a third transmission line, and output the third optical signal to the multiplexing unit.

Advantageous Effects of Invention

According to the present invention, it is possible to provide an optical add and drop multiplexer, an optical communication system, and a method for controlling an optical add and drop multiplexer, capable of ensuring the security in wavelength-multiplexing optical communication with a simple configuration.

DESCRIPTION OF EMBODIMENTS

First Example Embodiment

Figure 1:
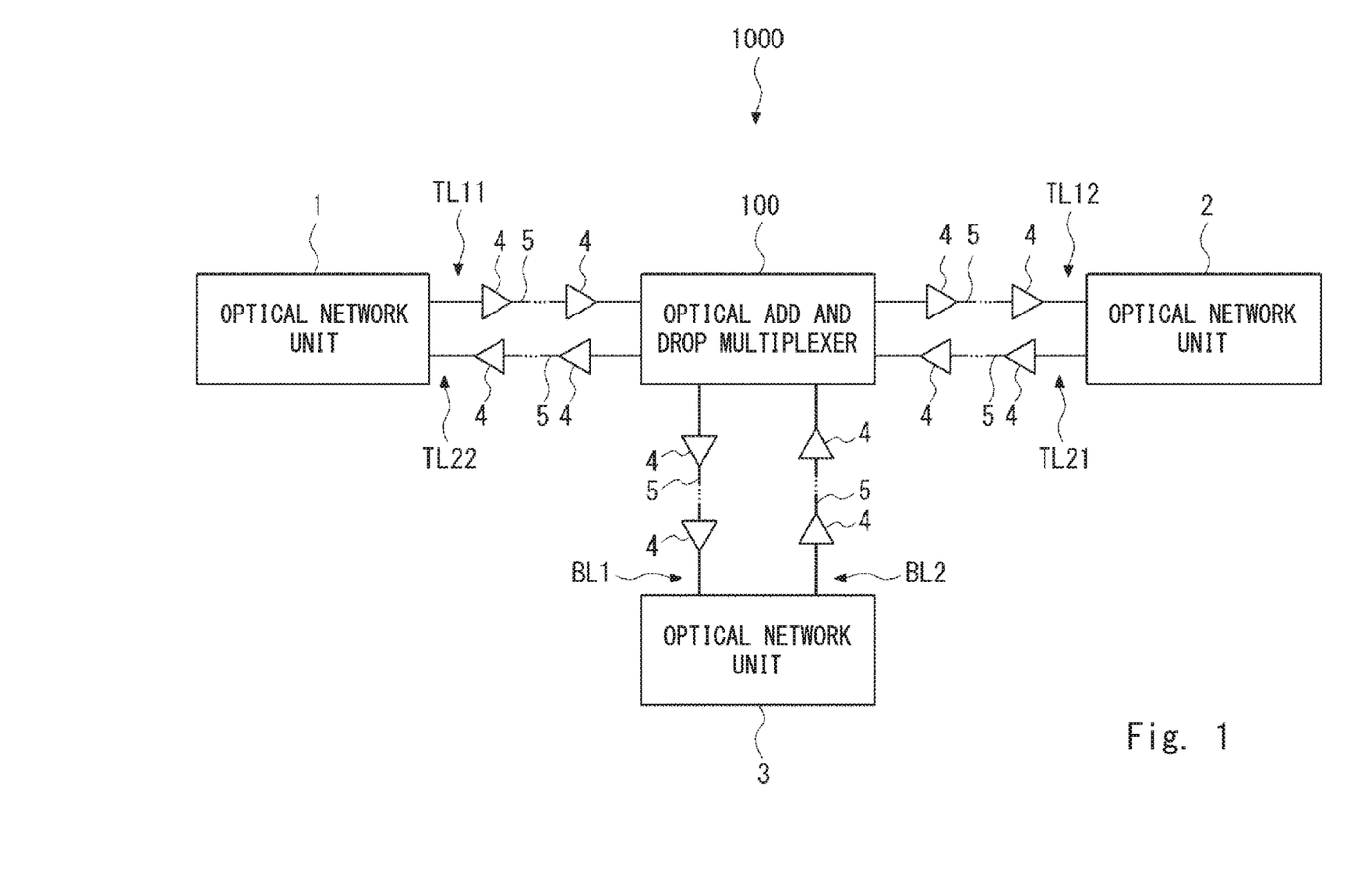
FIG. 1 schematically shows an example of a configuration of an optical communication system according to a first example embodiment.

Example embodiments according to the present invention will be described hereinafter with reference to the drawings. FIG. 1 schematically shows an example of a configuration of an optical communication system 1000 according to a first example embodiment, in this example, the optical communication system 1000 includes optical line terminals 1 to 3, optical relay amplifiers 4, optical fibers 5, and an optical add and drop multiplexer 100.

A transmission line through which an optical signal is transmitted between the optical line terminal 1 (also referred to as a first optical line terminal) and the optical line terminal 2 (also referred to as a second optical line terminal) is referred to as a trunk transmission line. The optical relay amplifiers 4 and the optical add and drop multiplexer 100 connected by the optical fibers 5 are disposed between the optical line terminals 1 and 2. Although only one optical add and drop multiplexer 100 is shown in this example for simplifying the explanation, the number of optical add and drop multiplexers 100 is not limited to one. The trunk transmission line includes transmission lines TL11, TL12, TL21, and TL22. The transmission line TL11 is a transmission line through which an optical signal is transmitted from the optical line terminal 1 to the optical add and drop multiplexer 100. The transmission line TL12 is a transmission line through which an optical signal is transmitted from the optical add and drop multiplexer 100 to the optical line terminal 2. The transmission line TL21 is a transmission line through which an optical signal is transmitted from the optical line terminal 2 to the optical add and drop multiplexer 100. The transmission line TL22 is a transmission line through which an optical signal is transmitted from the optical add and drop multiplexer 100 to the optical line terminal 1. Note that the transmission line TL11 is also referred to as a first transmission line, and the transmission line TL12 is also referred to as a third transmission line.

In order to amplify an optical signal which has been attenuated by the transmission, at least one optical relay amplifier 4 is provided between the optical line terminal 1 and the optical add and drop multiplexer 100. Similarly, at least one optical relay amplifier 4 is provided between the optical line terminal 2 and the optical add and drop multiplexer 100.

A transmission line through which an optical signal is transmitted between the optical line terminal 3 (also referred to as a third optical line terminal) and the optical add and drop multiplexer 100 is referred to as a branch transmission line. The branch transmission line includes a transmission line BL1 through which an optical signal is transmitted from the optical add and drop multiplexer 100 to the optical line terminal 3, and a transmission line BL2 through which an optical signal is transmitted from the optical line terminal 3 to the optical add and drop multiplexer 100. Note that the transmission line BL1 is also referred to as a fourth transmission line, and the transmission line BL2 is also referred to as a second transmission line. In the branch transmission line, in order to amplify an attenuated optical signal, at least one optical relay amplifier 4 connected by an optical fiber 5 is provide between the optical line terminal 3 and the optical add and drop multiplexer 100.

Figure 2:
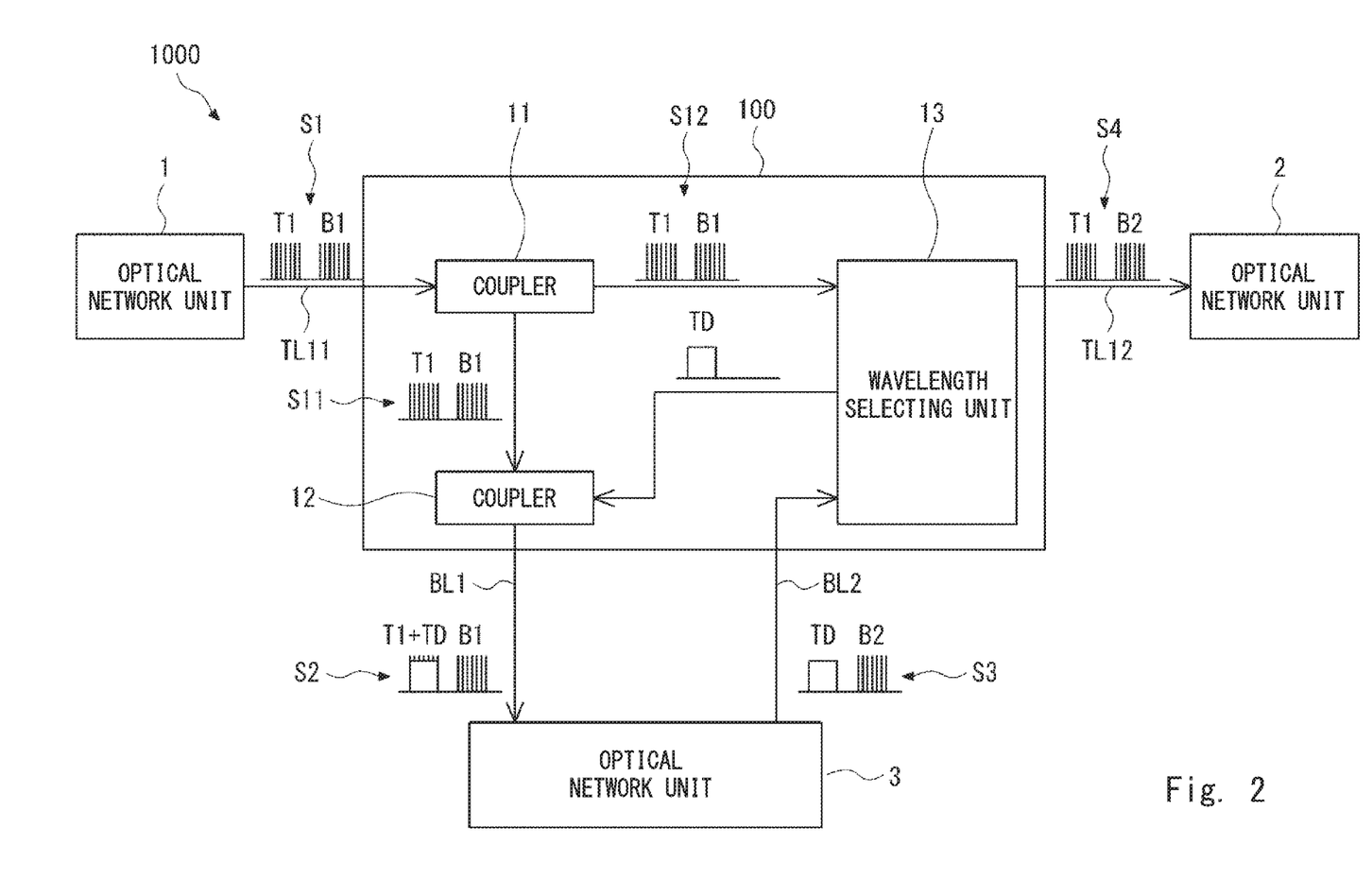
FIG. 2 schematically shows transmission of an optical signal in the optical communication system according to the first example embodiment.
Figure 3:
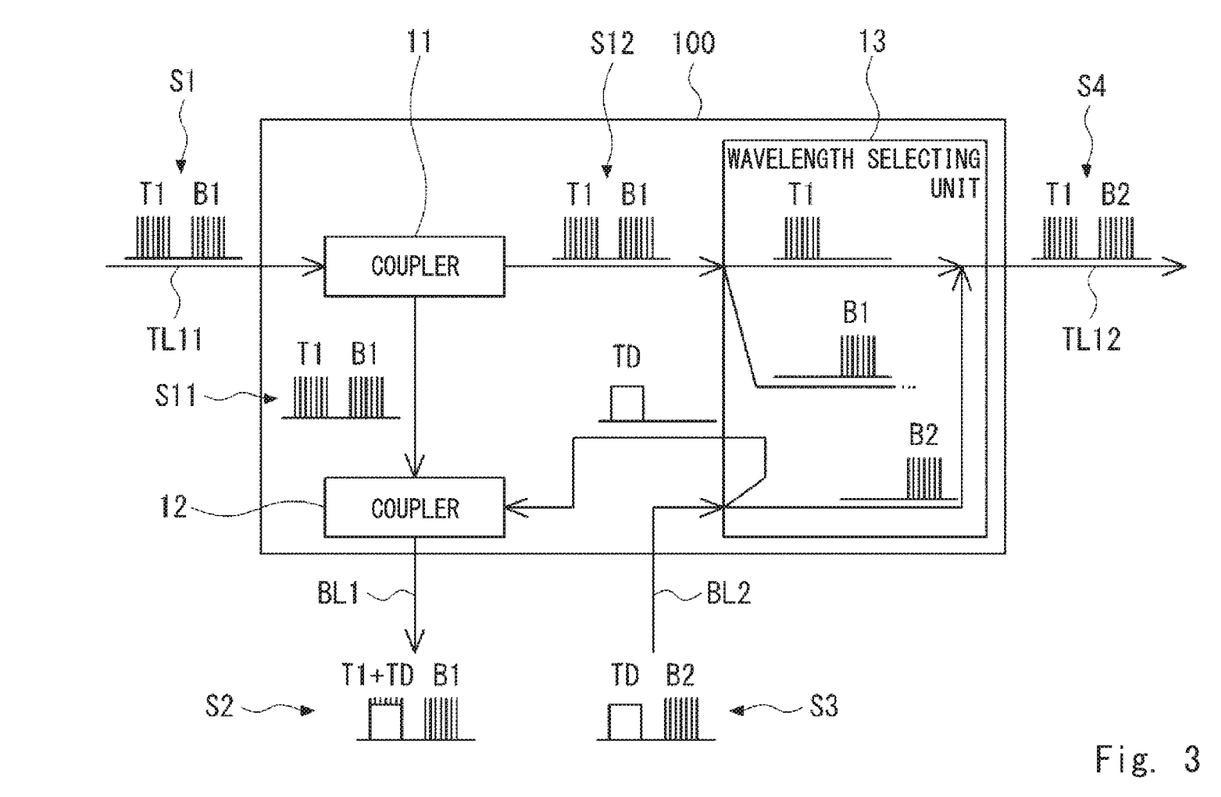
FIG. 3 schematically shows a configuration of an optical add and drop multiplexer according to the first example embodiment.

Next, an outline of operations performed by the optical communication system 1000 will be described. Here, an example in which a wavelength-multiplexed optical signal is output from the optical line terminal 1 to the optical add and drop multiplexer 100 through the transmission line TL11 will be described. FIG. 2 schematically shows transmission of an optical signal in the optical communication system 1000 according to the first example embodiment. FIG. 3 schematically shows a configuration of the optical add and drop multiplexer 100 according to the first example embodiment. The optical add and drop multiplexer 100 includes couplers 11 and 12 and a wavelength selection unit 13.

In this example, communication using an optical signal in a band T is performed between the optical line terminals of the trunk transmission line. Communication using an optical signal in a band B is performed between one or both of the optical line terminals 1 and 2 of the trunk transmission line and the optical line terminal 3 of the branch transmission line.

As shown in FIGS. 1 and 2, a wavelength-multiplexed optical signal S1 (also referred to as a first wavelength-multiplexed optical signal) output from the optical line terminal 1 to the optical add and drop multiplexer 100 includes an optical signal T1 in the band T (also referred to as a first optical signal) and an optical signal B1 in the band B (also referred to as a second optical signal). Further, a wavelength-multiplexed optical signal S3 (also referred to as a second wavelength-multiplexed optical signal) output from the optical line terminal 3 to the optical add and drop multiplexer 100 includes a dummy optical signal TD in the band T (also referred to as a third optical signal) and an optical signal B2 in the band B (also referred to as a fourth optical signal). The optical signals B1 and B2 are optical signals different from each other. The dummy optical signal TD is un-modulated continuous light having a wavelength in the band T. The dummy optical signal TD may be, for example, amplified spontaneous emission (ASE: Amplified Spontaneous Emission) light continuously output from a laser light source.

The coupler 11 receives the wavelength-multiplexed optical signal S1. The coupler 11 drops (DROP) the wavelength-multiplexed optical signal S1 from the transmission line TL11 to the transmission line BL1. Specifically, the coupler 11 branches the wavelength-multiplexed optical signal S1 into a wavelength-multiplexed optical signal S11 and a wavelength-multiplexed optical signal S12. The wavelength-multiplexed optical signal S11 is output to the coupler 12, and the wavelength-multiplexed optical signal S12 is output to the wavelength selection unit 13. Note that the coupler 11 is also referred to as a branching unit.

The wavelength selection unit 13 receives the wavelength-multiplexed optical signal S12 and the wavelength-multiplexed optical signal S3. The wavelength selection unit 13 multiplexes the optical signal included in the wavelength-multiplexed optical signal S3 with the wavelength-multiplexed optical signal transmitted through the transmission line TL12. Specifically, the wavelength selection unit 13 demultiplexes the optical signal T1 and the optical signal B1 included in the wavelength-multiplexed optical signal S12. Further, the wavelength selection unit 13 demultiplexes the dummy optical signal TD and the optical signal B2 included in the wavelength-multiplexed optical signal S3. Then, the wavelength selection unit 13 multiplexes the demultiplexed optical signal T1 and the optical signal B2, and outputs the multiplexed optical signal as a wavelength-multiplexed optical signal S4 (also referred to as a third wavelength-multiplexed optical signal) to the optical line terminal 2.

The optical line terminal 2 may receive an optical signal in a specific band included in the wavelength-multiplexed optical signal S4, for example, receive the optical signal T1 in the band T, and transfer optical signals in the other bands to other optical line terminals or other optical add and drop multiplexers. Further, the optical line terminal 2 may transfer the wavelength-multiplexed optical signal S4 to other optical line terminals or other optical add and drop multiplexers without receiving it.

Further, the wavelength selection unit 13 outputs the demultiplexed dummy optical signal ID to the coupler 12. The coupler 12 multiplexes the wavelength-multiplexed optical signal S11 output from the coupler 11 and the dummy optical signal TD output from the wavelength selection unit 13, and outputs the multiplexed optical signal as a wavelength-multiplexed optical signal S2 (also referred to as a fourth wavelength-multiplexed optical signal) to the optical line terminal 3. Note that the coupler 12 is also referred to as a multiplexing unit.

The optical line terminal 3 receives the optical signal B1 in the band B included in the wavelength-multiplexed optical signal S2. The optical line terminal 3 may transfer optical signals in some of the bands or those in all the bands included in the wavelength-multiplexed optical signal S2 to other optical line terminals or other optical add and drop multiplexers.

As described above, the optical line terminal 3 outputs the wavelength-multiplexed optical signal S3 including the dummy optical signal TD and the optical signal B2 in the band B to the optical add and drop multiplexer 100. The optical line terminal 3 may include, for example, a laser light source and output ASE light generated by the laser light source as the dummy optical signal TD. The optical line terminal 3 may output an optical signal modulated based on a data signal as the optical signal B2. Further, the optical line terminal 3 may receive one or both of the dummy optical signal TD and the optical signal B2 from other optical line terminals or other optical add and drop multiplexers, and transfer it or them to the optical add and drop multiplexer 100.

As described above, the optical signal T1 in the band T is used for communication in the trunk transmission line. Therefore, if the optical signal T1 that is not intended to be transmitted to the branch transmission line is transmitted to the optical line terminal 3, there is a risk that the security of the optical signal T1 in the optical line terminal 3 cannot be ensured. In other words, the optical line terminal 3 may decode the optical signal T1 even though the optical signal T1 is not intended to be received by the optical line terminal 3. Therefore, it may cause a security problem such as a leakage of information and eavesdropping.

To cope with this problem, the wavelength-multiplexed optical signal S11 and the dummy optical signal TD are multiplexed in this configuration. Therefore, the optical signal T1 and the dummy optical signal TD are superimposed on each other in the band T of the wavelength-multiplexed optical signal S2. In this way, it is possible to reduce the S/N ratio of the optical signal in the band T and thereby to degrade the signal quality thereof so that the optical line terminal 3 cannot decode the optical signal in the band T. As a result, even when the optical line terminal 3 of the branch transmission line receives an optical signal in the band T used for the communication through the trunk transmission line, the security of the optical signal in the band T in the optical line terminal 3 can be ensured.

Further, the dummy optical signal ID is dummy light necessary to secure the optical power of the wavelength-multiplexed optical signal S3 so that the optical relay amplifiers 4 in the transmission line BL2 can operate normally. In this configuration, the dummy optical signal TD, which is used as dummy light, is transferred to the coupler 12 by the wavelength selection unit 13. Therefore, it is possible to ensure the above-described security just by changing the path of the dummy optical signal TD, which is multiplexed with the wavelength-multiplexed optical signal S11, without requiring an additional component such as a light source for generating the dummy optical signal TD. It can be understood that since the path of the dummy optical signal TD can be formed by changing the setting of the wavelength selection unit 13, the security of the optical signal T1 can be easily ensured.

In this way, it is possible to reduce the number of components that are connected by optical fibers and thereby to reduce the loss of the optical signal inside the optical add and drop multiplexer. As a result, it is possible to reduce the power consumption required to amplify the wavelength-multiplexed optical signal.

In contrast to this, in the optical add and drop multiplexer according to the above-mentioned patent literature, a component(s) for dropping an optical signal to the branch transmission line and a component(s) for adding an optical signal from the branch transmission line are provided. Therefore, for example, when the hand ratio between the band T and the band B is changed, it is necessary to control at least two wavelength add and drop modules, thus making the control operation complicated. Further, for example, if the setting of only one of the wavelength add and drop modules is changed due to a control error or the like, abnormal transmission of an optical signal occurs. In contrast, in this configuration, it is possible to ensure the security just by controlling the wavelength selection unit 13. As a result, it is possible to simplify the control operation and prevent the above-described occurrence of an abnormality.

Note that even if the band of an optical signal of which the security needs to be ensured is changed from the band T to another band, all that needs to be done is to change the band of the dummy optical signal output from the wavelength selection unit 13 to the coupler 12 by changing the band of the dummy optical signal output from the optical line terminal 3 to the other band and by changing the setting of the wavelength selection unit 13. In this way, it is possible to ensure the security of the optical signal even when an optical signal in an arbitrary band is transmitted to the optical line terminal of the branch transmission line.

Figure 4:
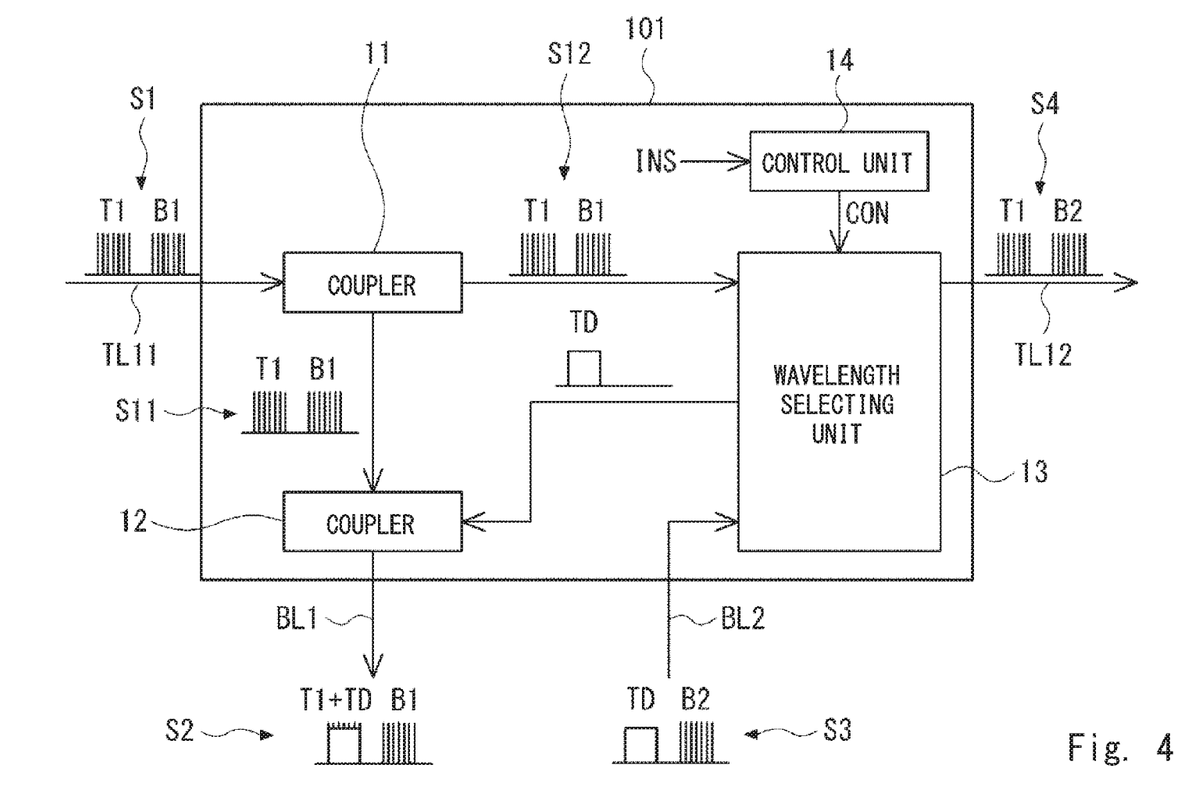
FIG. 4 schematically shows a configuration of a modified example of an optical add and drop multiplexer according to the first example embodiment.

FIG. 4 schematically shows a configuration of an optical add and drop multiplexer 101 which is a modified example of the optical add and drop multiplexer 100 according to the first example embodiment. The optical add and drop multiplexer 101 has a configuration that is obtained by adding a control unit 14 in the optical add and drop multiplexer 100. The control unit 14 controls the setting of the wavelength selection unit 13 by providing a control signal CON to the wavelength selection unit 13 according to a command signal INS provided from an external apparatus. In this way, even if one or both of the bands T and B are changed to other bands, it is possible to transmit optical signals through the trunk transmission line and the branch transmission line while ensuring the security thereof by having the control unit 14 control the wavelength selection unit 13.

The command signal INS may be an electric signal output from the optical line terminal 1. In this case, the command signal INS is input to the control unit 14 through an electric wiring line provided in the transmission line TL11.

The optical line terminal 1 may output an optical signal indicating information including an instruction to the control unit 14. In this case, the control unit 14 may convert the optical signal indicating information including the instruction to the control unit 14 into the electric command signal INS in an optical receiving unit provided inside the control unit 14, and generate the control signal CON according to the electric command signal INS. Alternatively, an optical signal indicating information including an instruction to the control unit 14 may be converted into an electric signal in an optical receiving unit provided separately from the control unit 14, and the converted electric signal may be provided to the control unit 14 as the command signal INS.

Second Example Embodiment

Figure 5:
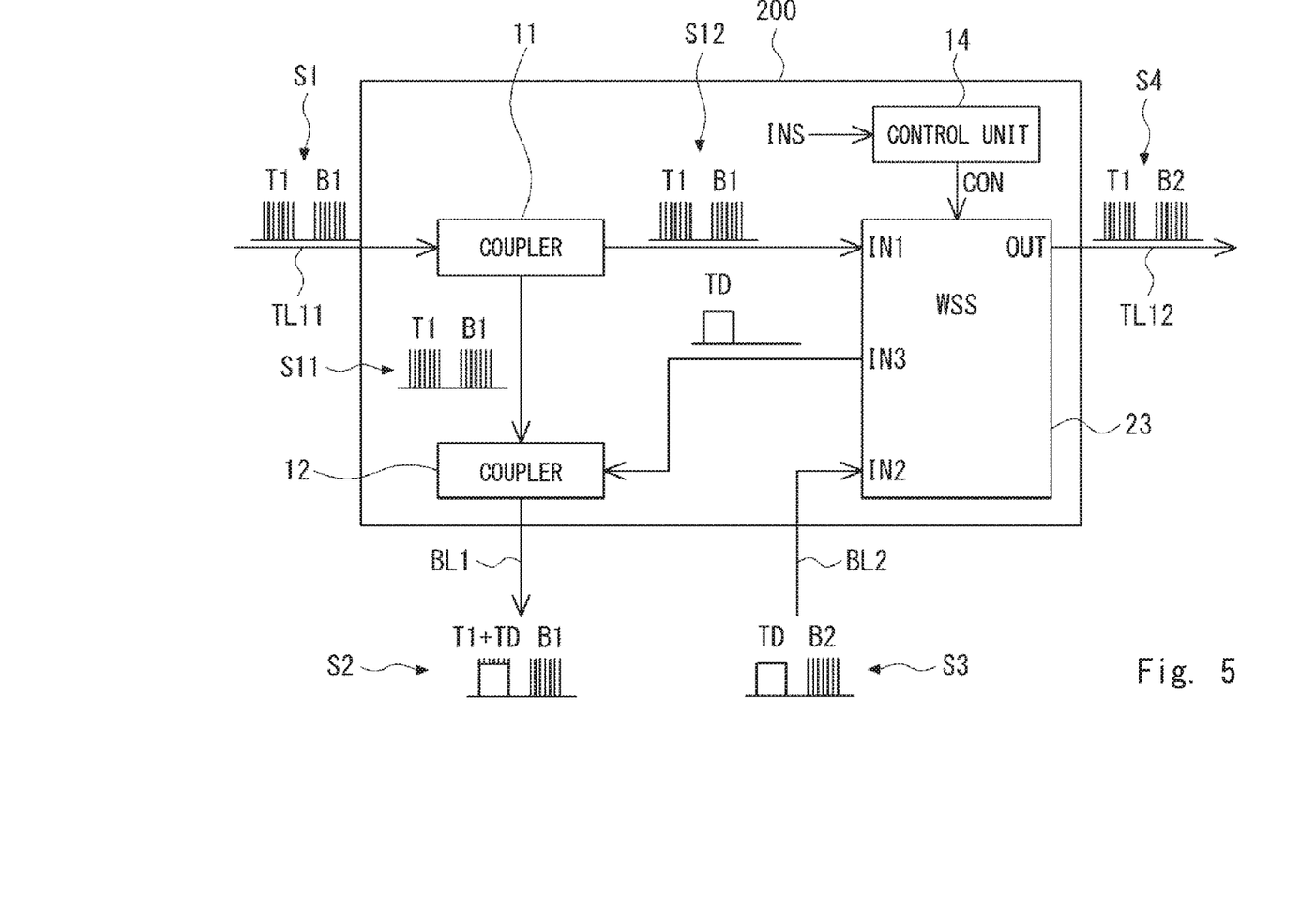
FIG. 5 schematically shows a configuration of an optical add and drop multiplexer according to a second example embodiment.

An optical add and drop multiplexer 200 according to a second example embodiment will be described. The optical add and drop multiplexer 200 uses a wavelength selective switch (WS S: Wavelength Selective Switch) as the wavelength selection unit. FIG. 5 schematically shows a configuration of the optical add and drop multiplexer 200 according to the second example embodiment. The optical add and drop multiplexer 200 has a configuration that is obtained by replacing the wavelength selection unit 13 of the optical add and drop multiplexer 100 according to the first example embodiment by a WSS 23.

The WSS 23 is configured as a WSS including at least three input ports and at least one output port OUT. In this example embodiment, the WSS 23 includes three input ports IN1 to IN3 and one output port.

A wavelength-multiplexed optical signal S12 including an optical signal T1 and an optical signal B1 is input to the input port IN1 (also referred to as a first input port). A wavelength-multiplexed optical signal S3 including a dummy optical signal ID and an optical signal B2 is input to the input port IN2 (also referred to as a second input port).

A wavelength-multiplexed optical signal S4 including the optical signal T1 and the optical signal B2 is output from the output port OUT. The dummy optical signal ID demultiplexed from the wavelength-multiplexed optical signal S3 is guided to the input port IN3 (also referred to as a third input port) inside the WSS 23, and is output from the input port IN3 to the coupler 12.

Figure 6:
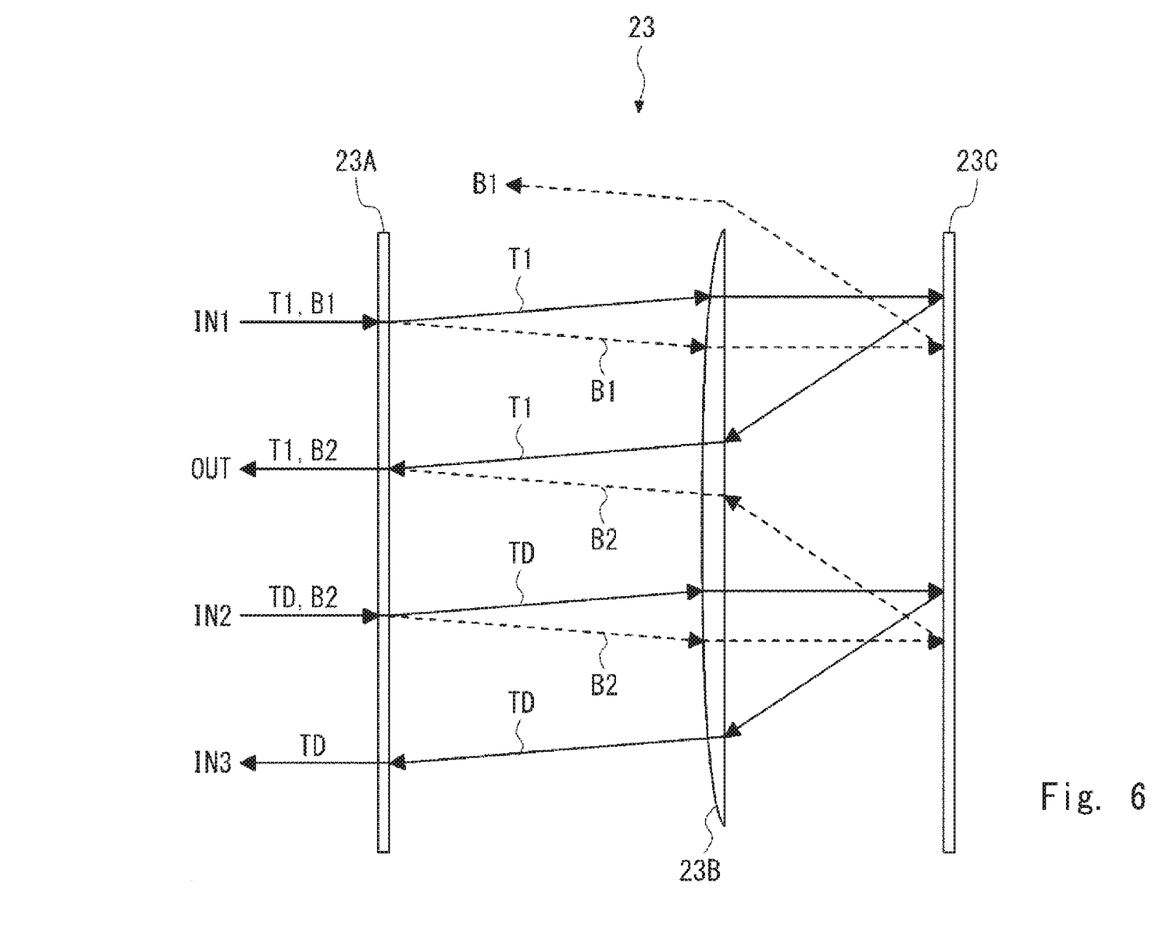
FIG. 6 schematically shows a configuration of a wavelength selective switch (WSS: Wavelength Selective Switch) according to the second example embodiment.

A configuration of the WSS 23 will be described hereinafter. FIG. 6 schematically shows a configuration of the WSS 23 according to the second example embodiment. The WSS 23 includes a diffraction grating 23A, a lens 23B, and a deflection mirror 23C. The diffraction grating 23A and the lens 23B form an optical system that demultiplexer an incident wavelength-multiplexed optical signal according to the wavelength and making the demultiplexed signals incident on the deflection mirror 23C.

The diffraction angle of light diffracted by the diffraction grating changes depending on the wavelength. By utilizing this property, the diffraction grating 23A can spatially separate optical signals having different wavelengths included in the wavelength-multiplexed optical signal input to the input port.

In FIG. 6, the optical signal T1 and the optical signal B1 included in the wavelength-multiplexed optical signal S12 input to the input port IN1 are diffracted in different directions by the diffraction grating 23A. The dummy optical signal TD and the optical signal B2 included in the wavelength-multiplexed optical signal S3 input to the input port IN2 are diffracted in different directions by the diffraction grating 23A. Needless to say, the diffraction angle of the optical signal T1 is equal to that of the dummy optical signal TD. The diffraction angle of the optical signal B1 is equal to that of the optical signal B2.

The diffracted optical signals T1, B1 and B2, and the dummy optical signal TD are collimated by the lens 23B. The collimated optical signals T1, B1 and B2 and the dummy optical signal TD are incident on the deflection mirror 23C.

The deflection mirror 23C is configured as a mirror that reflects incident light in a different direction according to the wavelength of the light. An LCOS (Liquid Crystal on Silicon) mirror may be used as the deflection mirror 23C. The optical signal T1 and the dummy optical signal TD are reflected by the deflection mirror 23C in a direction different from the direction of the optical signals B1 and B2.

The optical signal T1 and the optical signal B2 reflected by the deflection mirror 23C are refracted by the lens 23B and enter the output port OUT. In this way, the optical signal T1 and the optical signal B2 are multiplexed and output from the output port OUT as a wavelength-multiplexed optical signal S4.

Since the optical signal B1 is not included in the wavelength-multiplexed optical signal S4, the optical signal B1 is reflected by the deflection mirror 23C so as not to enter the output port OUT. In this example, the optical signal B1 is reflected by the deflection mirror 23C toward a place where the optical signal B1 is not incident on the lens 23B. In this way, the optical signal B1 is invalidated.

Since the dummy optical signal TD is not included in the wavelength-multiplexed optical signal S4, the dummy optical signal TD is reflected by the deflection mirror 23C so as not to enter the output port OUT. Note that in the optical add and drop multiplexer 200, the security of the optical signal T1 in the optical line terminal 3 is ensured by multiplexing the dummy optical signal TD with the optical signal T1 by using the coupler 12. Therefore, the WSS 23 is configured to output the dummy optical signal TD to the coupler 12. Specifically, the dummy optical signal TD reflected by the deflection mirror 23C is refracted by the lens 23B and reaches the input port IN3. The dummy optical signal TD, which has reached the input port IN3, is output from the input port IN3 to the coupler 12.

As described above, it can be understood that according to the WSS 23, similarly to the wavelength selection unit 13, the wavelength-multiplexed optical signal S4 can be output to the optical line terminal 2 and the dummy optical signal TD reflected by the deflection mirror 23C can be output from the input port IN3 to the coupler 12.

In general, an optical add and drop multiplexer is provided with a WSS to carry out the adding/dropping of optical signals. In such a WSS, there are cases where light input to one input port is reflected toward another input port due to the effect of a deflection mirror. In this configuration, the dummy optical signal reflected by the deflection mirror is output from the input port IN3 to the coupler 12 by using the reflection characteristic of the WSS which is originally provided in the optical add and drop multiplexer. That is, any WSS equipped with a deflection mirror can be used as the WSS 23. Further, it is possible to output a dummy optical signal from a desired input port to the coupler 12 by controlling the reflection angle of the dummy optical signal on the deflection mirror. This is advantageous because it can be implemented just by using the original function of the WSS without requiring an additional component. Note that similarly to the first example embodiment, the control unit 14 can control the deflection mirror 23C by outputting a control signal CON to the WSS 23 according to a command signal INS.

Further, since the deflection mirror 23C of the WSS 23 is configured to reflect an optical signal while causing no or small loss, the loss of the dummy optical signal output to the coupler 12 can be reduced. In this way, the S/N ratio of the optical signal in the band T of the wavelength-multiplexed optical signal S2 can be degraded to or close to an unreceivable level.

Further, even if the band of the dummy optical signal or other optical signals is changed, it is possible to output a desired wavelength-multiplexed optical signal from the output port OUT and output a dummy optical signal in a desired band from the input port IN3 to the coupler 12 by having the control unit 14 control the WSS 23. That is, even if one or both of the band T and the band B are changed to other bands, it is possible to transmit optical signals through the trunk transmission line and the branch transmission line while ensuring the security thereof by having the control unit 14 control the deflection mirror 23C of the WSS 23.

Other Example Embodiments

Note that the invention is not limited to the above-described example embodiments and various changes may be made therein without departing from the spirit and scope of the present invention. For example, although the above-described example embodiment has been described on the assumption that the optical add and drop multiplexer is laid down on the seabed, the place where the optical add and drop multiplexer is installed is not limited to the seabed. For example, the optical add and drop multiplexer according to the above-described example embodiment may be used in a communication system located on land.

Note that although the present invention is described as a hardware configuration in the above-described example embodiments, the present invention is not limited to the hardware configurations. For example, in the present invention, it is also possible to control the wavelength selection unit 13 and the WSS 23 by having a CPU (Central Processing Unit), a control unit 14 including a CPU, or a control unit 14 formed in the form of a CPU execute a computer program.

The program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

The wavelength-multiplexed optical signal has been described in the above-described example embodiment. Other multiplexing techniques such as polarization multiplexing and phase multiplexing may also be applied to the wavelength-multiplexed optical signal. For example, a wavelength division multiplexed DP-QPSK (Dual Polarization-Quadrature Phase Shift Keying) optical signal may be applied.

The above-described configuration of the WSS 23 is merely an example. That is, any WSS having other configurations including a deflection mirror and an optical system, capable of performing wavelength demultiplexing and multiplexing similar to those performed by the WSS 23 can be used.

Although the present invention is explained above with reference to example embodiments, the present invention is not limited to the above-described example embodiments. Various modifications that can be understood by those skilled in the art can be made to the configuration and details of the present invention within the scope of the invention.

This application is based upon and claims the benefit of priority from Japanese patent applications No. 2018-33212, filed on Feb. 27, 2018, the disclosure of which is incorporated herein in its entirety by reference.

REFERENCE SIGNS LIST 1-3 OPTICAL LINE TERMINAL
4 OPTICAL RELAY AMPLIFIER
5 OPTICAL FIBER
11, 12 COUPLERS
13 WAVELENGTH SELECTION UNIT
14 CONTROL UNIT

23 WSS
23A DIFFRACTION GRATING
23B LENS
23C DEFLECTION MIRROR
100, 101, 200 OPTICAL ADD AND DROP MULTIPLEXER
1000 OPTICAL COMMUNICATION SYSTEM
B1, B2, T1 OPTICAL SIGNAL
BL1, BL2, TL11, TL12, TL21, TL22 TRANSMISSION PATH
S1, S11, S12, S2-S4 WAVELENGTH-MULTIPLEXED OPTICAL SIGNAL
TD DUMMY OPTICAL SIGNAL
CON CONTROL SIGNAL
IN1-IN3 INPUT PORT
INS COMMAND SIGNAL
OUT OUTPUT PORT

The invention claimed is:

1. An optical add and drop multiplexer comprising:
a branching unit configured to branch a first wavelength-multiplexed optical signal input through a first transmission line, the first wavelength-multiplexed optical signal including a first optical signal and a second optical signal in a band different from that of the first optical signal;
a wavelength selection unit configured to receive one of the branched first wavelength-multiplexed optical signals branched by the branching unit, receive a second wavelength-multiplexed optical signal including a third optical signal in the same band as that of the first optical signal and a fourth optical signal in the same band as that of the second optical signal through a second transmission line, output a third wavelength-multiplexed optical signal including the first optical signal and the fourth optical signal to a third transmission line, and output the third optical signal; and
a multiplexing unit configured to output a fourth wavelength-multiplexed optical signal including the other of the branched first wavelength-multiplexed optical signals branched by the branching unit and the third optical signal output from the wavelength selection unit to a fourth transmission line.

2. The optical add and drop multiplexer according to claim 1, wherein
the wavelength selection unit is a wavelength selective switch,
the wavelength selective switch comprises:
an optical system configured to demultiplex the first optical signal from the first wavelength-multiplexed optical signal input to the first input port, and demultiplex the third optical signal and the fourth optical signal from the second wavelength-multiplexed optical signal input to the second input port; and
a deflection mirror configured to reflect incident light in a direction corresponding to a wavelength,
the deflection mirror reflects the first and fourth optical signals so that they enter the output port,
the deflection mirror reflects the third optical signal so that it enters the third input port, and
the third optical signal is output from the third input port to the multiplexing unit.

3. The optical add and drop multiplexer according to claim 2, further comprising a control unit configured to control a reflection of the optical signal on the deflection mirror, wherein
when one or both of the band of the first and third optical signals and the band of the fourth optical signal is changed, the control unit controls the deflection mirror so that, after the band(s) is/are changed, the first and fourth optical signals enter the output port and the third optical signal enters the third input port.

4. The optical add and drop multiplexer according to claim 2, wherein the deflection mirror is an LCOS (Liquid Crystal on Silicon) mirror.

5. The optical add and drop multiplexer according to claim 1, wherein the third optical signal is continuously emitted light.

6. The optical add and drop multiplexer according to claim 5, wherein the third optical signal is amplified spontaneous emission light output from a light source.

7. An optical communication system comprising:
an optical add and drop multiplexer;
a first optical line terminal configured to output a first wavelength-multiplexed optical signal including a first optical signal and a second optical signal in a band different from that of the first optical signal to the optical add and drop multiplexer through a first transmission line;
a second optical line terminal configured to receive a third wavelength-multiplexed optical signal from the optical add and drop multiplexer through a third transmission line; and
a third optical line terminal configured to output a second wavelength-multiplexed optical signal including a third optical signal in the same band as that of the first optical signal and a fourth optical signal in the same band as that of the second optical signal to the optical add and drop multiplexer through a second transmission line, and receive a fourth wavelength-multiplexed optical signal from the optical add and drop multiplexer through a fourth transmission line, wherein
the optical add and drop multiplexer comprises:
a branching unit configured to branch the first wavelength-multiplexed optical signal;
a wavelength selection unit configured to receive one of the branched first wavelength-multiplexed optical signals branched by the branching unit and the second wavelength-multiplexed optical signal, output a third wavelength-multiplexed optical signal including the first optical signal and the fourth optical signal to the third transmission line, and output the third optical signal; and
a multiplexing unit configured to output the fourth wavelength-multiplexed optical signal including the other of the branched first wavelength-multiplexed optical signals branched by the branching unit and the third optical signal output from the wavelength selection unit to the fourth transmission line.

8. A method for controlling an optical add and drop multiplexer, comprising:
in the optical add and drop multiplexer comprising:
a branching unit configured to branch a first wavelength-multiplexed optical signal input through a first transmission line, the first wavelength-multiplexed optical signal including a first optical signal and a second optical signal in a band different from that of the first optical signal;
a wavelength selection unit configured to receive one of the branched first wavelength-multiplexed optical signals branched by the branching unit, and receive a second wavelength-multiplexed optical signal including a third optical signal in the same band as that of the first optical signal and a fourth optical signal in the same band as that of the second optical signal through a second transmission line; and a multiplexing unit configured to output a fourth wavelength-multiplexed optical signal including the other of the branched first wavelength-multiplexed optical signals branched by the branching unit and the third optical signal output from the wavelength selection unit to a fourth transmission line, controlling the wavelength selection unit so as to output a third wavelength-multiplexed optical signal including the first optical signal and the fourth optical signal to a third transmission line, and output the third optical signal to the multiplexing unit.

* * * * *